United States Patent Office 3,116,297
Patented Dec. 31, 1963

3,116,297
PROCESS FOR THE PREPARATION OF PHENYLPYRIDYLALKYLAMINES
Thomas J. Kasper, Lansdowne, Pa., and Donald E. Rivard, Haddonfield, N.J., assignors to Smith Kline & French Laboratories, Philadelphia, Pa., a corporation of Pennsylvania
No Drawing. Filed Mar. 10, 1961, Ser. No. 94,722
7 Claims. (Cl. 260—296)

This invention relates to an improved process for the production of phenylpyridylalkylamines. In particular this process is advantageous for commercial production of the antihistamine, chlorprophenpyridamine.

The process of this invention provides for the production of phenylpyridylalkylamines, in particular chlorprophenpyridamine, at substantially lower cost due to the use of cheaper starting materials and to improved yields. In addition the process of this invention provides for greatly simplified isolation of the product. Also another advantage of the present invention is that the reagents and procedures are advantageous and convenient to use on a commercial scale.

By the process of this invention phenylpyridylaminoalkylacetonitriles are decyanogenated by treatment with potassium hydroxide in a water-immiscible aromatic hydrocarbon solvent to produce the phenylpyridylalkylamine products. The prior art methods of affecting this decyanogenation involve the use of a substantial excess of concentrated sulfuric or hydrohalic acid. Another prior art procedure uses sodamide in toluene or xylene. Either of these methods provides lower yields of product, involves more hazardous reagents and more complicated procedures and results in higher production costs than the process of this invention.

In addition the removal of the cyano group from a tertiary carbon atom has been accomplished in the prior art by use of potassium hydroxide in hydroxylic solvents such as ethylene glycol or ethanol. This method has been found to require a difficult and time-consuming workup when applied to the preparation of pure chlorprophenpyridamine. Unexpectedly the use of potassium hydroxide in a water-immiscible aromatic hydrocarbon solvent such as, preferably, xylene has been found to overcome the disadvantages of the prior art processes and to provide a very useful commercial method for the preparation of antihistamine agents.

The process according to this invention comprises the removal of a cyano group to prepare phenylpyridylalkylamines according to the following procedure:

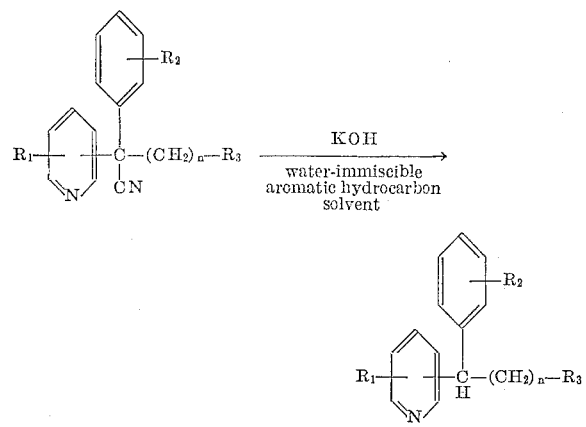

when:

$R_1$ is hydrogen or lower alkyl;
$R_2$ is hydrogen, halogen, lower alkyl, lower alkoxy, hydroxyl, amino, lower alkylamino, nitro and carboxy;
$R_3$ is dialkylamino, morpholino or piperidino; and $n$ is an integer of from 2 to 4.

The reaction is carried out by reacting a phenylpyridylaminoalkylacetonitrile with at least an equimolar amount and preferably about a 2–10 molar excess of potassium hydroxide in a water-immiscible aromatic hydrocarbon solvent. The solvent used is preferably one that boils in the range of from about 135 to 160° C. such as, preferably, xylene. Alternatively, other water-immiscible aromatic solvents having boiling points up to about 195° C. such as p-cymene, dichlorobenzene or dimethylaniline may be used. It is convenient to run the reaction at the boiling point of the solvent or at about 135–160° C. for a period of from about 16–24 hours. The length of the reaction period is dependent upon the temperature at which the reaction is carried out.

The phenylpyridylalkylamine product is isolated from the reaction mixture by the following procedure. The reaction mixture is washed with water and the solvent is removed by distillation in vacuo. The residue is distilled in vacuo to gve the desired product.

It has been found that the decyanogenation process of this invention may be carried out using, as the starting material, crude phenylpyridylaminoalkylacetonitrile as well as the purified nitrile. Excellent yields of the amine product are obtained when crude nitrile is used and the overall process is simplified since purification of the intermediate nitrile may be elimnated.

Further illustration of the process of this invention is provided by the following examples which are intended to be illustrative only and are not limiting.

Example 1

To 100 g. of 2-(4-chlorophenyl)-4-dimethylamino-2-(2-pyridyl)butyronitrile is added 360 ml. of xylene and 90 g. of potassium hydroxide. The resulting mixture is heated at reflux with stirring for 20–24 hours. The mixture is cooled and washed with water. The xylene is removed in vacuo and the residue is distilled to give 3-(4-chlorophenyl)-3-(2-pyridyl) - N,N-dimethylpropylamine, B.P. 140–142° C. at 0.5 mm.

Example 2

A mixture of 250 g. of 4-dimethylamino-2-phenyl-2-(2-pyridyl)butyronitrile, 180 g. of potassium hydroxide and 750 ml. of xylene is heated at reflux for 20–24 hours. Washing with water, removing the solvent in vacuo and distilling the residue in vacuo gives 3-phenyl-3-(2-pyridyl)-N,N-dimethylpropylamine.

Example 3

Potassium hydroxide (180 g.) and xylene (700 ml.) are added to 300 g. of 2-(4-bromophenyl)-4-dimethylamino-2-(2-pyridyl)butyronitrile. The mixture is heated at reflux for 20 hours, then is cooled and washed with water. The solvent is removed in vacuo and the residue is distilled in vacuo to give 3-(4-bromophenyl)-3-(2-pyridyl)N,N-dimethylpropylamine.

Example 4

A mixture of 100 g. of crude 2-(4-chlorophenyl)-4-dimethylamino-2-(2-pyridyl)butyronitrile, prepared by alkylating 4-chlorobenzyl cyanide with 2-chloropyridine and β-dimethylaminoethyl chloride with sodamide in xylene and washing the reaction mixture with water, and 95 g. of potassium hydroxide in 250 ml. of xylene is refluxed for 24 hours. The cooled reaction mixture is washed with water, stripped of solvent and distilled in vacuo to give 3-(4-chlorophenyl)-3-(2-pyridyl)-N,N-dimethylpropylamine.

Example 5

A mixture of 200 g. of 2-phenyl-4-piperidino-2-(2-pyridyl)butyronitrile and 150 g. of potassium hydroxide in 500 ml. of xylene is heated at reflux for 20 hours. Cooling, washing with water, removing the xylene and distilling the residue in vacuo gives N-[3-phenyl-3-(2-pyridyl)propyl]piperidine.

Example 6

The procedure of Example 5 was repeated with 200 g. of 2-phenyl-4-morpholino-2-(2-pyridyl)butyronitrile as the starting material. N-[3-phenyl-3-(2-pyridyl)propyl]morpholine is obtained as the product.

Example 7

Potassium hydroxide (40 g.) is added to 75 g. of 2 - (4 - methoxyphenyl) - 4 - dimethylamino - 2 - (2 pyridyl)butyronitrile in 200 ml. of xylene. Refluxing the reaction mixture for 20 hours then cooling, washing wih water, removing the solvent and distilling the residue gives 3 - (4 - methoxyphenyl) - 3 - (2 - pyridiyl) - N,N-dimethylpropylamine.

Example 8

A mixture of 100 g. of 2-(4-isopropylphenyl)-4-dimethylamino-2-(2-pyridyl)butyronitrile and 75 g. of potassium hydroxide in 200 ml. of p-cymene is heated at reflux for 16 hours. The cooled mixture is washed with water, concentrated and distilled to give 3-(4-isopropylphenyl)-3-(2-pyridyl)-N,N-dimethylpropylamine.

Example 9

A mixture of 330 g. of 2-(3-aminophenyl)-6-dimethylamino-2-(2-pyridyl)capronitrile and 80 g. of potassium hydroxide in 500 ml. of xylene is heated at reflux for 24 hours. Working up as in Example 8 fiives 5-(3-aminophenyl)-5-(2-pyridyl)-N,N-dimethylpentylamine.

Example 10

Potassium hydroxide (75 g.) and 2-(4-nitrophenyl)-4-dimethylamino - 2 - (2-pyridyl)butyronitrile (100 g.), prepared by alkylation of 4-nitrobenzylcyanide with 2-chloropyridine and β-dimethylaminoethyl chloride, is heated at 170° C. in dichlorobenzene for 18 hours. Cooling, washing with water, removing the solvent and distilling the residue gives 3-(4-nitrophenyl)-3-(2-pyridyl)-N,N-dimethylpropylamine.

What is claimed is:

1. A process of preparing phenyl-pyridylalkylamines having the following structural formula:

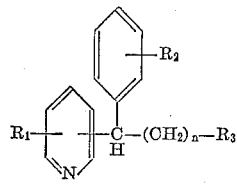

in which $R_1$ is a member selected from the group consisting of hydrogen and lower alkyl; $R_2$ is a member selected from the group consisting of hydrogen, halogen, lower alkyl, lower alkoxy, hydroxyl, amino, lower alkylamino, nitro and carboxy; $R_3$ is a member selected from the group consisting of dialkylamino, morpholino or piperidino; and $n$ is an integer of from 2 to 4, which comprises decyanogenating a phenylpyridylaminoalkylacetonitrile having the following structural formula:

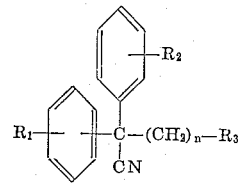

in which $R_1$, $R_2$, $R_3$ and $n$ are as previously defined by heating with at least an equimolar amount of potassium hydroxide in a water-immiscible aromatic hydrocarbon solvent at a temperature in the range of from about 135° C. to 160° C. for from about 16–24 hours.

2. The process of claim 1 in which the potassium hydroxide is present in about a 2–10 molar excess.

3. The process of claim 1 in which the solvent is xylene.

4. The process of claim 3 in which the reaction is run at the reflux temperature of the reaction mixture.

5. The process of preparing 3-(4-chlorophenyl)-3-(2-pyridyl)-N,N-dimethylpropylamine which comprises decyanogenating 2 - (4 - chlorophenyl) - 4 - dimethylamino-2-(2-pyridyl)butyronitrile by heating at reflux with an excess of potassium hydroxide in xylene for about 16–24 hours.

6. The process of preparing 3-phenyl-3-(2-pyridyl)-N,N-dimethylpropylamine which comprises decyanogenating 4 - dimethylamino - 2 - phenyl - 2 - (2 - pyridyl)-butyronitrile by heating at reflux with an excess of potassium hydroxide in xylene for about 16–24 hours.

7. The process of preparing 3-(4-bromophenyl)-3-(2-pyridyl)-N,N-dimethylpropylamine which comprises decyanogenating 2 - (4 - bromophenyl) - 4 - dimethylamino-2-(2-pyridyl)butyronitrile by heating at reflux with an excess of potassium hydroxide in xylene for about 16–24 hours.

References Cited in the file of this patent

UNITED STATES PATENTS

| | | |
|---|---|---|
| 2,827,465 | Buzas et al. | Mar. 18, 1958 |
| 2,829,144 | Benner | Apr. 1, 1958 |

FOREIGN PATENTS

| | | |
|---|---|---|
| 776,705 | Great Britain | June 12, 1957 |

OTHER REFERENCES

MacArdle: Use of Solvents in Synthetic Org. Chemistry (1925), pages 1–3.

Kato: Chem. Abstracts, volume 50, column 8664, (1956).